(12) United States Patent
Janning et al.

(10) Patent No.: US 9,450,508 B2
(45) Date of Patent: Sep. 20, 2016

(54) MODULAR SWITCH FOR AN ELECTRICAL CONVERTER, ELECTRICAL CONVERTER, AS WELL AS METHOD FOR OPERATING AN ELECTRICAL CONVERTER

(75) Inventors: Joerg Janning, Berlin (DE); Samir Salama, Berlin (DE)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 673 days.

(21) Appl. No.: 13/137,801

(22) Filed: Sep. 14, 2011

(65) Prior Publication Data

US 2012/0063185 A1 Mar. 15, 2012

(30) Foreign Application Priority Data

Sep. 15, 2010 (DE) .................. 10 2010 046 142

(51) Int. Cl.
*H02M 7/219* (2006.01)
*H02M 7/217* (2006.01)
*H02M 7/483* (2007.01)

(52) U.S. Cl.
CPC ............ *H02M 7/219* (2013.01); *H02M 7/217* (2013.01); *H02M 2007/4835* (2013.01)

(58) Field of Classification Search
CPC ................... H02M 7/219; H02M 2007/4835; H02M 1/12; H02M 7/06; H02M 7/21; H02M 7/217; H02M 7/2176; H02M 2001/12; H02M 2001/322; H02M 2007/217
USPC .................................... 363/126, 37
See application file for complete search history.

(56) References Cited

U.S. PATENT DOCUMENTS

| 5,642,275 | A | 6/1997 | Peng et al. | |
|---|---|---|---|---|
| 8,223,517 | B2 * | 7/2012 | Kishida et al. | 363/67 |
| 8,547,718 | B2 * | 10/2013 | Katoh | H02M 1/088 363/131 |
| 8,576,593 | B2 * | 11/2013 | Mori et al. | 363/67 |

(Continued)

FOREIGN PATENT DOCUMENTS

| CN | 101253675 A | 8/2008 |
|---|---|---|
| DE | 10103031 A1 | 7/2002 |

(Continued)

OTHER PUBLICATIONS

J. Salmon and D. Koval Improving the Operation of 3-phase Diode Rectifiers using an Asymmetrical Bridge DC-Link Active Filter Industry Applications Conference, 2000. Conference Record of the 2000 IEEE (vol. 4 ) pp. 2115-2122 vol. 4.*

(Continued)

*Primary Examiner* — Timothy J Dole
*Assistant Examiner* — Shahzeb K Ahmad
(74) *Attorney, Agent, or Firm* — Wood IP LLC (57) ABSTRACT

Described is a modular switch for an electrical converter. The modular switch is provided with a first series circuit including a first controllable power semiconductor component and a first diode as well as with a second series circuit including a second diode and a second controllable power semiconductor. The connecting point between the first power semiconductor component and the first diode forms a first terminal and the connecting point between the second diode and the second power semiconductor component forms a second terminal of the modular switch. Also provided is a capacitor, wherein the first series circuit and the second series circuit and the capacitor are switched parallel to each other.

20 Claims, 3 Drawing Sheets

(56) References Cited

U.S. PATENT DOCUMENTS

| | | | |
|---|---|---|---|
| 8,854,843 B2* | 10/2014 | Trainer et al. | 363/35 |
| 8,867,244 B2* | 10/2014 | Trainer et al. | 363/65 |
| 2003/0048651 A1* | 3/2003 | Trimble | H02M 7/2173 363/125 |
| 2012/0037616 A1* | 2/2012 | Kitahara et al. | 219/665 |

FOREIGN PATENT DOCUMENTS

| | | | |
|---|---|---|---|
| WO | WO2010082265 | * | 7/2010 |
| WO | WO-2010149200 A1 | | 12/2010 |

OTHER PUBLICATIONS

John Salmon, Mihaela Ciulei, An asymmetrical half-bridge active dc filter for industrial drive systems using multipulse utility rectifiers with harmonic reducing input transformers, Electric Machines and Drives Conference, 2003. IEMDC'03. IEEE International (vol. 2 ), pp. 876-882 vol. 2.*

European Search Report dated Jul. 13, 2012.

Marquardt, R., "Modular Multilevel Converter: An universal concept for HVDC-Networks and extended DC-Bus-applications," 2010 International Power Electronics Conference, pp. 502-507, Jun. 21, 2010.

Steffen Rohner et al., "Analysis and Simulation of a 6kV, 6MVA Modular Multilevel Converter," IECON-35$^{th}$ Annual Conference of IEEE Industrial Electronics, pp. 225-230, Nov. 3, 2009.

Steffen Rohner et al., "Modelling, simulation and analysis of a Modular Multilevel Converter for medium voltage applications," 2010 IEEE International Conference, pp. 775-782, Mar. 14, 2010.

Davidson, Colin C. et al., "The future of high power electronics in Transmission and Distribution power systems," 13$^{th}$ European Conference on Power Electronics and Applications, pp. 1-14, Sep. 8, 2009.

Hirofumi, A., "Classification, terminology, and application of the modular multilevel cascade converter (MMCC)," 2010 International Power Electronics Conference, pp. 508-515, Jun. 21, 2010.

European Search Report dated Apr. 24, 2013.

Ertl, H. et al., "A Constant Output Current Three-Phase Diode Bridge Rectifier Employing a Novel 'Electronic Smoothing Inductor,'" IEEE Transactions on Industrial Electronics, Bd. 52, Nr. 2, Apr. 1, 2005.

Ilves, K. et al., "Steady-State Analysis of Interaction Between Harmonic Components of Arm and line Quantities of Modular Multilevel Converters," IEEE Transactions on Power Electronics, Bd. 27, Nr. 1 Jan. 1, 2012.

Unofficial English translation of CN Office Action issued Jun. 19, 2014 in connection with corresponding CN Patent Application No. 201110272891.2.

* cited by examiner

MODULAR SWITCH FOR AN ELECTRICAL CONVERTER, ELECTRICAL CONVERTER, AS WELL AS METHOD FOR OPERATING AN ELECTRICAL CONVERTER

PRIORITY STATEMENT

The present application hereby claims priority under 35 U.S.C. §119 on German patent application numbers DE 10 2010 046 142.3 filed Sep. 15, 2010, the entire contents of each of which are hereby incorporated herein by reference.

FIELD

At least one embodiment of the invention generally relates to a modular switch for an electrical converter, to an electrical converter, and/or to a method for operating an electrical converter.

BACKGROUND

A converter is a circuit intended for converting electrical energy. For the intermediate storage of electrical energy, an intermediate circuit is provided which is connected to a direct current and is generally configured with one or more capacitors. For each phase of the alternating voltage, the intermediate circuit can be provided with two series-connected, controllable switches, arranged parallel thereto, to which respectively one free-wheeling diode can be assigned. These switches are controlled in such a way that an alternating voltage can be tapped at the connecting points of the switches.

A converter of this type, for example, can be a rectifier or an AC/DC converter or in general a power converter.

A power converter circuit is known from the document DE 101 03 031 A1 for which each phase is configured with a plurality of series-connected, identical subsystems. Each subsystem is provided with a capacitor having two series-connected, controllable switches, connected parallel thereto, which are respectively provided with a free-wheeling diode. The capacitors for the subsystems of a phase consequently form the intermediate circuit for this phase.

One disadvantage of the known power converter circuit is that the capacitors of the individual subsystems generally do not have the same charging state, so that the voltages present at the intermediate circuits for the phases are also not the same. During the operation, meaning when the switches are activated, this leads to charge reversals which, in turn, result in oscillating currents between the phases.

SUMMARY

At least one embodiment of the present invention provides a converter, for example one which does not have at least one of the disadvantages of the converters according to the prior art.

At least one embodiment of the invention is directed to a modular switch for an electrical converter, an electrical converter, and/or a method for operating an electrical converter.

The modular switch according to at least one embodiment of the invention is provided with a first series circuit including a first controllable power semiconductor component and a first diode, as well as with a second series circuit including a second diode and a second controllable power semiconductor component. The connecting point between the first power semiconductor component and the first diode forms a first terminal and the connecting point between the second power semiconductor component and the second diode forms a second terminal for the modular switch. A capacitor is furthermore provided, wherein the first series circuit, the second series circuit and the capacitor are connected parallel to each other.

The electrical converter according to at least one embodiment of the invention is intended for converting a two-phase or a multi-phase alternating voltage into a controllable direct voltage or vice versa. The converter is provided with a plurality of the aforementioned modular switches, wherein at least two modular switches are connected in series for each phase of the alternating voltage. Via the switching states of the individual modular switches, the controllable direct voltage can dynamically assume positive as well as negative values.

The modular switch according to at least one embodiment of the invention is designed for only one current-flow direction. In the opposite current-flow direction, the power semiconductor components will block the current flow. As a result, the current-flow direction is also not reversible in the converter according to at least one embodiment of the invention. This configuration has the advantage that only compensating currents—if any at all—can develop between the converter phases, but no oscillating currents.

With the method according to at least one embodiment of the invention, the power semiconductor components of the converter phases are switched in such a way that deviations are reduced in the voltages at the intermediate circuits of the phases which are formed by the capacitors. As a result, the voltages at the intermediate circuits of the converters, which are formed by the capacitors, can be influenced in such a way that they are approximately equal, meaning that these voltages deviate as little as possible. Compensating current flows between the individual phases of the converter can thus be avoided.

According to one advantageous embodiment of the invention, the connecting voltage is essentially the same as that of the negative or the positive direct voltage if both power semiconductor components are switched off or switched on and/or the connecting voltage is essentially equal to zero if one of the two power semiconductor components is switched off and the other one is switched on. In this way, it is advantageously possible that the connecting voltage is either essentially equal to the negative direct voltage or is essentially equal to the positive direct voltage or is essentially equal to zero.

It is particularly useful if respectively one freewheeling diode is connected parallel to the power semiconductor components, wherein this serves to protect the power semiconductor components.

For example, if insulated gate bipolar transistors (IGBTs) are used as power semiconductor components, these only have limited restricting capacity. In that case, it may be necessary to increase the restricting capacity of the individual IGBTs with a further series-connected diode. It is also possible to connect the individual IGBTs to respectively one anti-parallel freewheeling diode. In the latter case, a current flow in negative direction is possible, to be sure, but this current flow only results in charging the capacitor up to the present connecting voltage. The current flow then stops, thereby also stopping the charge-reversal operation. Freewheeling diodes can thus also be used to avoid oscillating currents between the phases of a converter configured with several modular switches.

With the aid of the modular switch according to at least one embodiment of the invention, nearly all possible multilevel and/or multipoint converter designs can be configured with modular components. For example, multilevel converters having three or five operating points can be realized with the aid of the modular switches according to at least one embodiment of the invention. As a result of the modular configuration, the expenditure and thus also the costs for realizing these multi-level converters are reduced.

BRIEF DESCRIPTION OF THE DRAWINGS

Additional features, options for use and advantages of at least one embodiment of the invention are disclosed in the following description of example embodiments of the invention which are illustrated in the associated Figures. All described or illustrated features either by themselves of in any optional combination therefore represent the subject matter of the invention, regardless of how they are combined in the patent claims and regardless of the references back, as well as regardless of how they are formulated and/or shown in the description or the drawing.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 1:
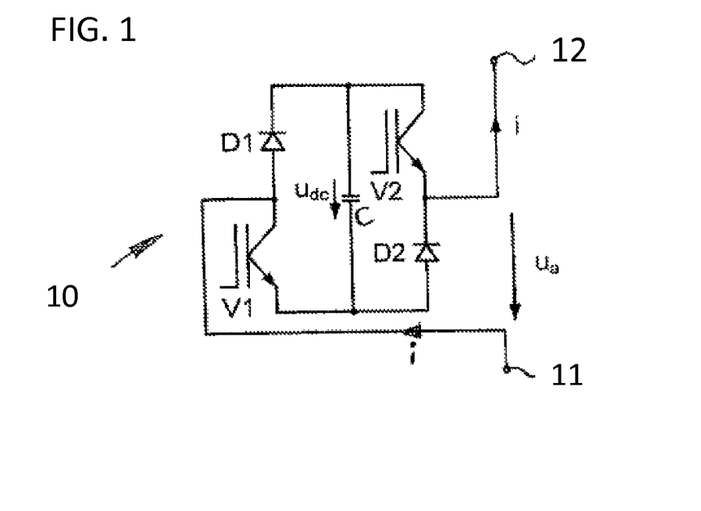
FIG. 1 shows an electric wiring diagram of an example embodiment of a modular switch for an electrical converter.

FIG. 1 illustrates a modular switch 10 which is intended for use in an electrical converter.

The modular switch 10 comprises a first series circuit of a first controllable power semiconductor component V1 and a first diode D1, as well as a second series circuit including a second diode D2 with a second controllable power semiconductor component V2.

The two controllable power semiconductor components V1, V2 can each be connected in series with a diode in order to increase the restricting capacity.

In the first series circuit, the collector of the first power semiconductor component V1 and the anode of the first diode D1 are connected, wherein this connecting point is referred to as terminal 11. For the second series circuit, the emitter of the second power semiconductor component V2 and the cathode of the second diode D2 are connected, wherein this connecting point is referred to as the second terminal 12.

The two series circuits are furthermore connected parallel to each other. The cathode of the first diode D1 is thus connected to the collector of the second power semiconductor component V2 and the emitter of the first power semiconductor component V1 is connected to the anode of the second diode D2.

A capacitor C is switched parallel to the two parallel-connected series circuits.

A direct voltage $u_{dc}$ is present at the capacitor C and a connecting voltage $u_a$ is present between the two terminals 11, 12. The direction of the aforementioned voltages is indicated in FIG. 1. A current i furthermore flows from the first terminal 11 in the direction of the second terminal 12.

The power semiconductor components V1, V2 are controllable switches, for example transistors, in particular field-effect transistors or thyristors which are provided, if applicable, with the required auxiliary circuits, and especially GTO thyristors (GTO=gate turn off) or IGBTs (IGBT=insulate gate bipolar transistor) or comparable electronic components. In dependence on the layout of the power semiconductor components V1, V2 the terminals for same can also have different designations. The above-used terms collector and emitter are used in connection with the example of utilizing IGBTs. The capacitor C can be embodied unipolar.

The modular switch 10 can have four switching states:

If the power semiconductor component V1, V2 are both shut down (restricting), the current i flows from the first terminal 11 via the diode D1 and the capacitor C and via the diode D2 to the second terminal 12. The capacitor C is charged by this current i, thereby increasing the direct voltage $u_{dc}$. Apart from the voltage drops at the diodes D1, D2, the connecting voltage $u_a$ is equal to the negative direct voltage $-u_{dc}$, meaning $u_a=-u_{dc}$.

If the power semiconductor components V1, V2 are both activated (conducting), the current i flows from the first terminal 11 via the first power semiconductor component V1, via the capacitor C and via the second power semiconductor component V2 to the second terminal 12. The capacitor C is discharged by this current i so that the direct voltage $u_{dc}$ decreases. Apart from the voltage drops at the power semiconductor components V1, V2, the connecting voltage $u_a$ is equal to the positive direct voltage $u_{dc}$, meaning $u_a=u_{dc}$.

If the first power semiconductor component V1 is activated (conducting) and the second power semiconductor component V2 is deactivated (restricting), the current i flows from the first terminal 11 via the first power semiconductor component V1 and via the second diode D2 to the second terminal 12. The direct voltage $u_{dc}$ at the capacitor C remains constant in that case. Apart from the voltage drops at the first power semiconductor component V1 and the second diode D2, the connecting voltage $u_a$ is equal to zero, meaning $u_a=0$.

If the first power semiconductor component V1 is switched off (restricting) and the second power semiconductor component V2 is switched on (conducting), the current i flows over the terminal 11 via the first diode D1 and the second power semiconductor component V2 to the second terminal 12. The direct voltage $u_{dc}$ at the capacitor C remains constant. Apart from the voltage drops at the first diode D1 and the second power semiconductor component V2, the connecting voltage $u_a$ is equal to zero, meaning $u_a=0$.

The current i flowing through the modular switch 10 always flows in the same direction, wherein this direction is predetermined by the diodes D1, D2. The connecting voltage $u_a$ essentially can assume three values, meaning $u_a=-u_{dc}$ or $u_a=u_{dc}$ or $u_a=0$. The direct voltage $u_{dc}$ at the capacitor C can increase or decrease.

Figure 2:
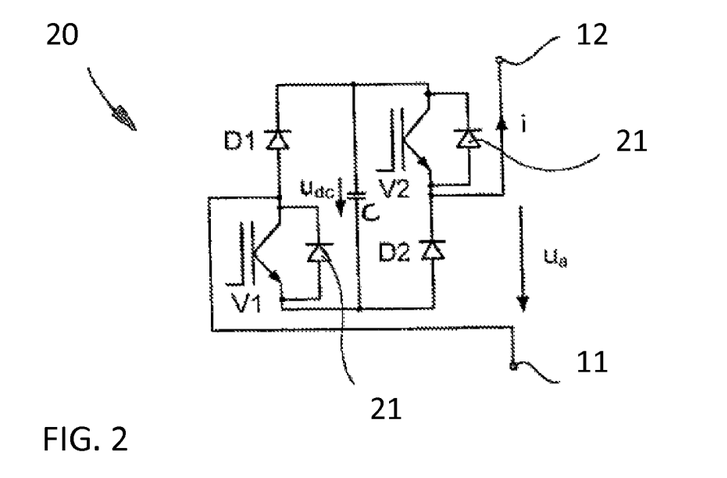
FIG. 2 shows the wiring diagram from FIG. 1 but supplemented with different components.

FIG. 2 shows a modular switch 20, comprising all components shown for the modular switch 10 in FIG. 1 and, with respect to the technical switch design, which is identical to the switch 10 in FIG. 1. Matching components of the modular switch 20 in FIG. 2 are therefore provided with the same references as the modular switch 10 in FIG. 1. Insofar, we point to the above description of the modular switch 10 shown in FIG. 1.

In addition to the parts shown for the modular switch 10 in FIG. 1, the modular switch 20 in FIG. 2 is provided with a freewheeling diode 21 for each of the two power semiconductor components V1, V2. However, we expressly point out that these freewheeling diodes are not required per se for the operation of the modular switch 20 in FIG. 2. That is to say, the modular switch 20 is fully functional even without the freewheeling diodes 21, in the manner as described for the switch 10 in FIG. 1.

In practical operations, however, the freewheeling diodes 21 are provided to protect the power semiconductor components V1, V2. The freewheeling diodes 21 make it possible to prevent damage to the power semiconductor components V1, V2 in the event of an undesirable reversal of the flow direction for the current i.

Under normal circumstances, the current i flows in positive direction of the current arrow shown in FIG. 2. If the current i reverses direction, however, it then flows over the freewheeling diodes 21. The connecting voltage $u_a$ becomes $u_a=+U_{dc}$ and the capacitor C is charged. In that case, the switching state of the power semiconductor components V1, V2 does not play a role.

With the aid of the freewheeling diodes 21, it can furthermore be achieved that no voltage reversal takes place at the capacitor C, so that a unipolar capacitor can be used, if desired.

Figure 3:
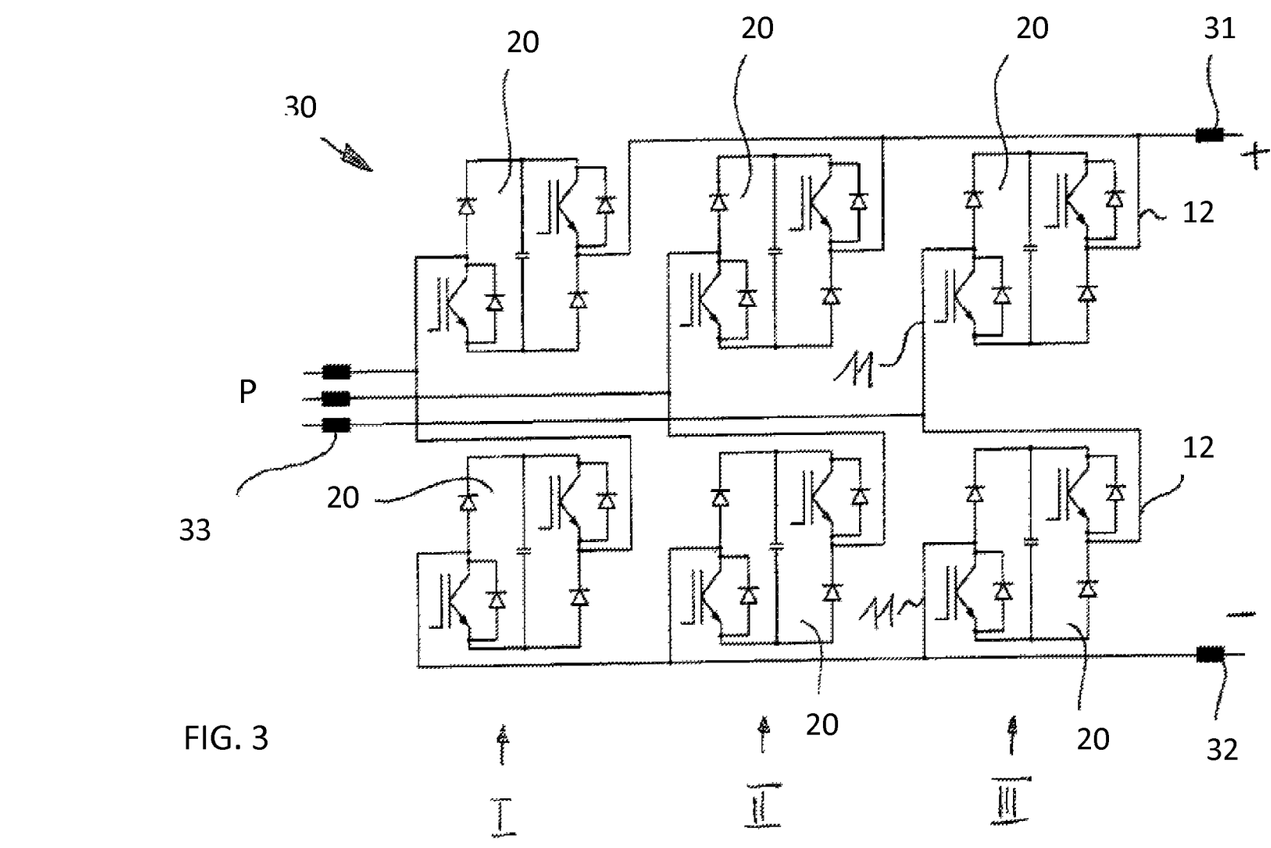
FIGS. 3 and 4 respectively show a wiring diagram of an example embodiment of an electrical converter, using the modular switch shown in FIG. 2.

FIG. 3 shows an electrical converter 30 which is configured with the modular switch 20, shown in FIG. 2, wherein this relates to a so-called multilevel or multipoint converter having three operating points in the case as shown in FIG. 3.

The converter 30 is embodied, for example, for the connection to a three-phase alternating voltage, wherein the respective components of the three phases are characterized as I, II, III. It is understood that the converter 30 can also be embodied as a two-phase or in general as a multiphase converter.

Two modular switches 20 are assigned to each phase of the converter 30.

As shown with the aid of phase III of the converter 30, the terminal 11 of the first, upper switch 20 is connected to the terminal 12 of the second, lower switch 20. The terminal 12 of the first, upper switch 20 is furthermore connected via a first intermediate circuit inductance 31 to a positive pole+ while the terminal 11 of the second, lower switch 20 is connected to a negative pole– via a second intermediate circuit inductance 32. It is furthermore possible that only one of the two intermediate circuit inductances 31, 32 is present.

A direct voltage is present between the positive and the negative pole. The direct voltage can have different values and, in particular, can also be positive or negative. The direct voltage can furthermore be generated with a different converter which is switched in the opposite direction as the converter 30 in FIG. 3. This different converter can be embodied identical to the converter 30.

The connecting point between the two modular switches 20 is conducted via an inductance 33 to a terminal P where the phases of the alternating voltage are present.

Each of the modular switches 20 is connected via a parasitic inductance to the intermediate circuit inductances 31, 32. These parasitic inductances can also be embodied discrete. The parasitic inductances in particular are useful for limiting the current during possible compensation operations.

With respect to the other two phases I and II, the converter 30 is configured correspondingly. The inductances 33 of the three phases can be realized, for example, with a three-phase or rotary current choke. The inductances 33, however, can also be realized with a connected inductive load or a transformer.

As previously explained, the connecting voltage $u_a$ of each modular switch 20 can assume essentially three states: $u_a=-u_{dc}$ or $u_a=u_{dc}$ or $u_a=0$. The voltage of each phase of the terminal P can therefore also essentially assume these three states, relative to the positive or negative pole.

Thus, with a predetermined direct voltage at the positive or negative pole, an alternating voltage can be generated at the terminal P of the converter 30 through a corresponding activation of the power semiconductor components V1, V2 for the individual modular switches 20. Reversely, with a predetermined alternating voltage at the terminal P, it is possible to generate a direct voltage between the positive and the negative pole through a corresponding actuation of the power semiconductor components V1, V2 of the individual modular switches 20.

The charging state of the capacitors C in the individual modular switches 20 can deviate because of the possible charging and discharging of the capacitors C. It follows from this that the voltages at the intermediate circuits for the individual phases, formed by the respective capacitors C, may not be the same, wherein this can lead to charge reversals between the phases.

By correspondingly activating the power semiconductor components V1, V2, especially by correspondingly switching the components V1, V2 of the modular switches 20 of the individual phases of the converter 30, it is possible to reduce a deviation in the voltages at the intermediate circuits for the individual phases, formed by the respective capacitors C.

For example, this can be achieved by extending or shortening the time interval for switching on or switching off the two power semiconductor components V1, V2 of a modular switch 20. As a result of this measure—as previously explained—the direct voltage $u_{dc}$ can be increased or reduced in the associated capacitor C.

Alternatively, this can be achieved by switching the power semiconductor components V1, V2 of the individual modular switches 20 to redundant switching states, which have the same effect on the output side.

The remaining charge reversals that may still occur do not lead to oscillating currents between the phases. This follows—as previously explained—from the fact that the current i flowing in the individual modular switches 20 can flow only in one direction. Possible charge reversals can thus only result in compensating currents in one direction, but not to a current reversal and thus also not to oscillating currents.

Figure 4:
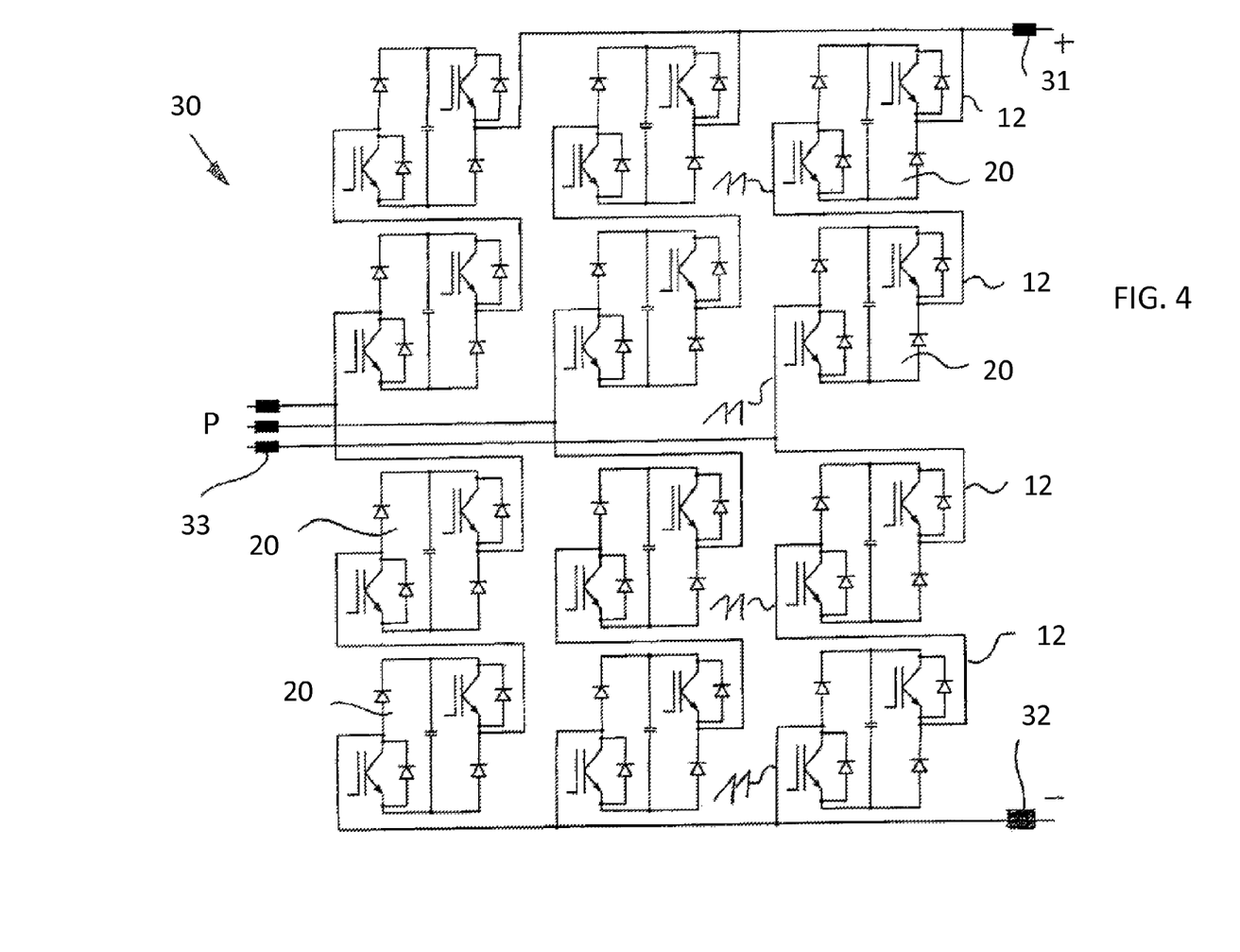

FIG. 4 shows a converter 40 which is configured using a modular switch 20 as shown in FIG. 2. This converter is a so-called multilevel or multipoint converter which, for the embodiment shown in FIG. 4, has five operating points.

The converter 40 is embodied, for example, for connecting it to a three-phase alternating current. It is understood that the converter 40 can also be embodied for connecting it to a two-phase or in general to a multiphase current.

Four modular switches 20 are assigned to each phase of the converter 40. The four switches 20 of each phase are correspondingly connected via the terminals 11, 12, as previously explained with the aid of the converter 30 in FIG. 3 and as shown in FIG. 4. In the same way, the switches 20 of each phase are connected via the intermediate circuit inductance (inductances) 31, 32 and the inductances 33 to the positive pole+ and the negative pole−, as well as to the terminal P.

As previously explained, the connecting voltage $u_a$ of each modular switch 20 can assume essentially three states: $u_a=-u_{dc}$ or $u_a=u_{dc}$ or $u_a=0$. Relative to the positive and negative pole, the voltage for each phase of the terminal P can thus assume on the whole five states, meaning: $u_a=-2u_{dc}$ or $u_a=-u_{dc}$ or $u_a=0$ or $u_a=u_{dc}$ or $u_a=2u_{dc}$.

With respect to the converter 40 shown in FIG. 4 we otherwise point to the explanations provided for the converter 30 shown in FIG. 3.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A modular switch for an electrical converter controlling multi-phase voltage, comprising:
   a first series circuit including a first controllable power semiconductor component and a first diode;
   a second series circuit including a second diode and a second controllable power semiconductor component, a connecting point between the first power semiconductor component and the first diode forming a first terminal of the modular switch and a connecting point between the second diode and the second power semiconductor component forming a second terminal of the modular switch; and
   a capacitor, the first series circuit and the second series circuit and the capacitor being connected parallel to each other, wherein voltage at the capacitor is adjusted by adjusting a time interval for actuating the first controllable power semiconductor component, and adjusting a time interval for actuating the second controllable power semiconductor component wherein a current flows from the first terminal in a direction of the second terminal, and
   wherein the modular switch corresponds to a phase of the multi-phase voltage and is connected in series with another modular switch for the same phase, an input of the modular switch being connected with an output of the other modular switch for the same phase; and
   wherein an output of the modular switch is connected to outputs of a plurality of modular switches of other phases and an input of the other modular switch of the same phase is connected to inputs of a plurality of modular switches of other phases; and
   wherein first and second controllable power semiconductor components of each modular switch are correspondingly activated for each phase, by changing the time interval to dynamically control voltage for the corresponding phase to be approximately equal to voltage of other phases of the multi-phase voltage.

2. The modular switch according to claim 1, wherein, for the first series circuit, a collector of the first power semiconductor component and an anode of the first diode are connected, and wherein for the second series circuit, an emitter of the second power semiconductor component and a cathode of the second diode are connected.

3. The modular switch according to claim 2, wherein a direct voltage is present at the capacitor and wherein, between the two terminals, a connecting voltage exists which is either essentially equal to a negative direct voltage, essentially equal to a positive direct voltage or essentially equal to zero.

4. The modular switch according to claim 3, wherein the connecting voltage is essentially equal to the negative or the positive direct voltage and wherein both power semiconductor components are switched off or switched on.

5. The modular switch according to claim 1, wherein voltage is present at the capacitor and wherein, between the two terminals, a connecting voltage exists which is either essentially equal to a negative direct voltage, essentially equal to a positive direct voltage or essentially equal to zero.

6. The modular switch according to claim 5, wherein the connecting voltage is essentially equal to the negative or the positive direct voltage if both power semiconductor components are switched off or switched on.

7. The modular switch according to claim 6, wherein the connecting voltage is essentially equal to zero if one of the two power semiconductor components is switched off and the other one is switched on.

8. The modular switch according to claim 5, wherein the connecting voltage is essentially equal to zero if one of the two power semiconductor components is switched off and the other one is switched on.

9. The modular switch according to claim 1, wherein respectively one freewheeling diode is connected parallel to the power semiconductor components.

10. The modular switch according to claim 1, wherein a diode is respectively connected in series with the power semiconductor components to increase the restricting capacity.

11. The modular switch of claim 1, wherein changing the time interval comprises one of extending or shortening the time interval.

12. An electrical converter for converting a multiphase voltage said converter comprising:
   a plurality of modular switches, each modular switch connected to another modular switch for each phase of the multi-phase voltage such that an input of each modular switch is connected to an output of the other modular switch for the same phase, and wherein;
   wherein an output of each modular switch is connected to outputs of a plurality of modular switches of other phases and an input of the other modular switch of the same phase is connected to inputs of a plurality of modular switches of other phases, and each modular switch comprising:
   a first series circuit including a first controllable power semiconductor component and a first diode;
   a second series circuit including a second diode and a second controllable power semiconductor component, a connecting point between the first power semiconductor component and the first diode forming a first terminal of the modular switch and a connecting point between the second diode and the second power semiconductor component forming a second terminal of the modular switch; and
   a capacitor, the first series circuit and the second series circuit and the capacitor being connected parallel to each other, wherein voltage at the capacitor is adjusted by adjusting a time interval for actuating the first controllable power semiconductor component, and adjusting a time interval for actuating the second controllable power semiconductor component, and
   wherein first and second controllable power semiconductor components of each modular switch are correspondingly activated for each phase, by changing the time interval to dynamically control the voltage for the phase to be approximately equal to voltage of other phases of the multi-phase voltage.

13. The electrical converter according to claim 12, wherein the series-connected modular switches of each phase are connected via at least one intermediate circuit inductance to a positive pole and a negative pole on the direct voltage.

14. The converter according to claim 13, wherein a connecting point for the modular switches of each phase is connected via an inductance to a terminal of the alternating voltage.

15. The converter according to claim 12, wherein a connecting point for the modular switches of each phase is connected via an inductance to a terminal of the alternating voltage.

16. A method for operating an electrical converter controlling a multi-phase voltage, the electrical converter comprising a plurality of modular switches, the method comprising:
connecting at least two modular switches in series for each phase of the multi-phase voltage wherein an input of one modular switch is connected to an output of another modular switch for the same phase and wherein an output of the modular switch is connected to outputs of a plurality of modular switches of other phases and an input of the other modular switch of the same phase is connected to inputs of a plurality of modular switches of other phases;
adjusting a voltage at a capacitor connected in parallel with a first series circuit and a second series circuit of each modular switch,
wherein the adjusting includes (i) adjusting a time interval for actuating a first controllable power semiconductor component of the first series circuit, and (ii) adjusting a time interval for actuating a second controllable power semiconductor component of the second series circuit,
wherein the first series circuit includes a first controllable power semiconductor component and a first diode, and the second series circuit includes a second diode and a second controllable power semiconductor component,
wherein a connecting point between the first power semiconductor component and the first diode forming a first terminal and a connecting point between the second diode and the second power semiconductor component forms a second terminal; and
correspondingly activating first and second controllable power semiconductor components of each modular switch for each phase, by changing the time interval to dynamically control the voltage for the phase to be approximately equal to voltage of other phases of the multi-phase voltage.

17. The method according to claim 16, wherein the interval is shortened or extended during which the two power semiconductor components of a modular switch are switched on or switched off.

18. The method according to claim 16, wherein the power semiconductor components of one of the modular switches are switched to states which have the same effect at the output side.

19. The method of claim 16, wherein changing the time interval comprises one of extending or shortening the time interval.

20. An electrical converter for converting a multi-phase voltage, the electrical converter comprising:
at least two modular switches connected in series for each phase of the multi-phase voltage such that an input of one modular switch is connected to an output of another modular switch for the same phase;
wherein an output of the modular switch is connected to outputs of a plurality of modular switches of other phases and an input of the other modular switch of the same phase is connected to inputs of a plurality of modular switches of other phases, and
wherein each modular switch comprises a first series circuit and a second series circuit and a capacitor being connected in parallel to each other and each first series circuit and second series circuit comprising a controllable power semiconductor component and diode,
wherein the first and second controllable power semiconductor components of each modular switch are correspondingly activated for each phase, by changing the time interval to dynamically control the voltage for the phase to be approximately equal to voltage of other phases of the multi-phase voltage.

* * * * *